United States Patent
Pistoia et al.

(10) Patent No.: US 9,009,535 B2
(45) Date of Patent: *Apr. 14, 2015

(54) ANOMALY DETECTION AT THE LEVEL OF RUN TIME DATA STRUCTURES

(75) Inventors: Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/587,335

(22) Filed: Aug. 16, 2012

(65) Prior Publication Data

US 2014/0053028 A1 Feb. 20, 2014

(51) Int. Cl.
G06F 11/00 (2006.01)
G06F 11/07 (2006.01)

(52) U.S. Cl.
CPC .................................. G06F 11/0751 (2013.01)

(58) Field of Classification Search
CPC ......... H04L 43/04; H04L 63/08; H04L 63/20; H04L 43/16; H04L 63/1425
USPC ....................................................... 714/38.1
See application file for complete search history.

(56) References Cited

U.S. PATENT DOCUMENTS

| | | |
|---|---|---|
| 2003/0018928 A1 | 1/2003 | James et al. |
| 2010/0100774 A1 | 4/2010 | Ding et al. |
| 2010/0287537 A1 | 11/2010 | Dattathrani |
| 2011/0051992 A1* | 3/2011 | Cobb et al. ..................... 382/100 |
| 2011/0185422 A1 | 7/2011 | Khayam et al. |
| 2011/0238855 A1* | 9/2011 | Korsunsky et al. ........... 709/231 |
| 2011/0276836 A1* | 11/2011 | Kahana et al. ................ 714/38.1 |
| 2012/0151270 A1* | 6/2012 | Stolfo et al. .................. 714/38.1 |
| 2012/0272289 A1* | 10/2012 | Chang et al. ...................... 726/1 |
| 2014/0053028 A1 | 2/2014 | Pistoia et al. |

OTHER PUBLICATIONS

Taylor et al., "Anomaly Detection in Concurrent Software by Static Data Flow Analysis," http://www.ip.com/pubview/IPCOM000150947D, University of Colorado at Boulder, Boulder, Colorado, original publication date Apr. 30, 1979, 50 pages.

Cova et al., "Swaddler: An Approach for the Anomaly-Based Detection of State Violations in Web Applications," RAID '07, Proceedings of the 10th International Conference on Recent Advances in Intrusion Detection, Queensland, Australia, 4637:63-86, Sep. 5-7, 2007.

Lucia et al., "Finding Concurrency Bugs with Context-Aware Communication Graphs," MICRO '09, Proceedings of the 2009 42nd Annual IEEE/ACM International Symposium on Microarchitecture, New York, New York, Dec. 12-16, 2009, 11 pages.

(Continued)

*Primary Examiner* — Jigar Patel
(74) *Attorney, Agent, or Firm* — Yee & Associates, P.C.; Anna Dougherty

(57) ABSTRACT

A useful embodiment of the invention is directed to a method associated with a computer program comprising one or more basic blocks, wherein the program defines and uses multiple data structures, such as the list of all customers of a bank along with their account information. The method includes identifying one or more invariants, wherein each invariant is associated with one of the data structures. The method further includes determining at specified times whether an invariant has been violated. Responsive to detecting a violation of one of the invariants, the detected violation is flagged as an anomaly.

7 Claims, 3 Drawing Sheets

(56) References Cited

OTHER PUBLICATIONS

Tripp et al., "Hawkeye: Effective Discovery of Dataflow Impediments to Parallelization," OOPSLA '11, Proceedings of the 2011 ACM International Conference on Object Oriented Programming Systems Languages and Applications, Prtland Oregon, Oct. 22-27, 2011, 17 pages.

Bristow et al., "Anomaly Detection in Concurrent Programs," http://www.ip.com/pubview/IPCOM000150951D, University of Colorado at Boulder, Boulder, Colorado, originally published on Jan. 1979, 37 pages.

Office action regarding U.S. Appl. No. 13/614,671, 15 pages, Mar. 13, 2014

* cited by examiner

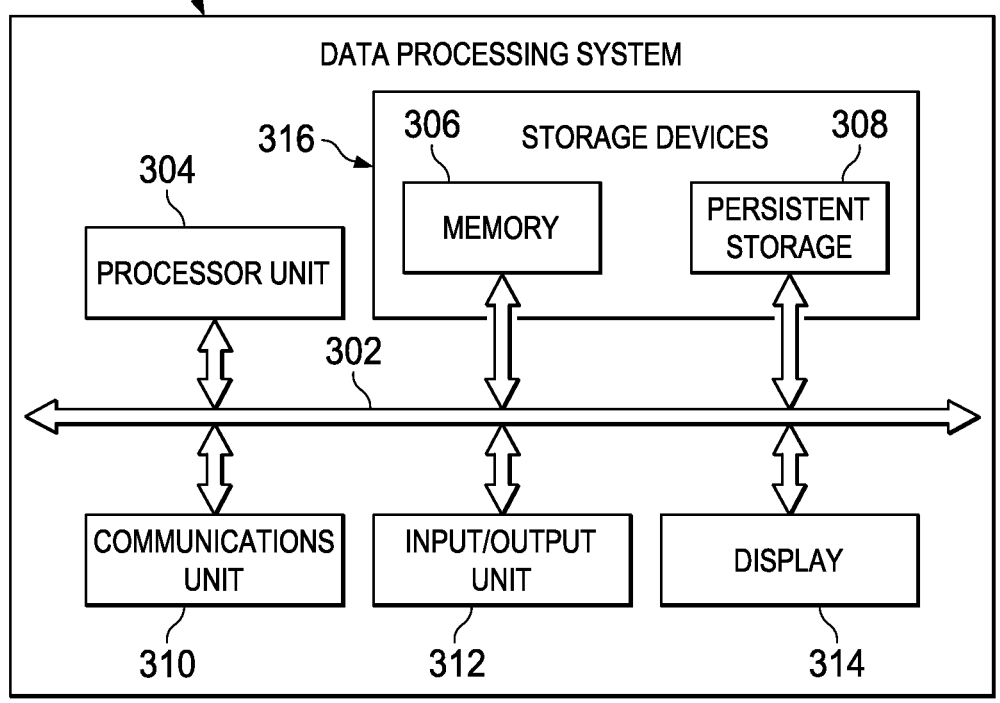
FIG. 3
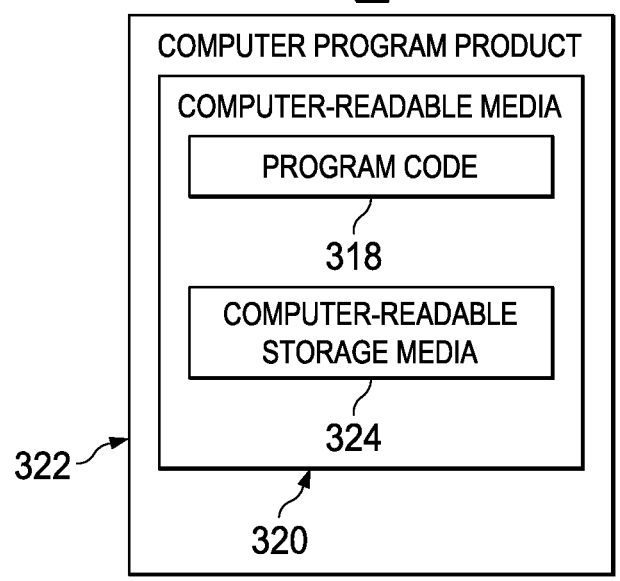

ANOMALY DETECTION AT THE LEVEL OF RUN TIME DATA STRUCTURES

BACKGROUND

1. Field

The invention disclosed and claimed herein generally pertains to a method of anomaly detection at the code level of a computer program. More particularly, the invention pertains to a method of the above type, wherein invariants associated with data structures of the program's concrete state are used to detect anomalies.

2. Description of the Related Art

Anomaly detection is the act of detecting patterns in a given data set that do not conform to an established normal behavior. Anomaly detection is a highly active area of research and development in academia as well as in industry, and breaks into two subareas. One subarea is rule-based anomaly detection, which is the act of discovering anomalies based on a set of rules defining normal behavior. The other subarea is statistical anomaly detection, which uses learning techniques to automatically infer a set of "likely invariants" that characterize the normal behavior of the software system. In this case, there is no need for a user provided specification of the normal behavior. Instead, the anomaly detection system needs to be trained prior to its deployment.

A recent and significant development in the area of statistical anomaly detection, published in a paper of Cova et al., referred to herein as the "Swaddler approach", suggests that anomalies can be discovered at the level of program code, rather than at the external interface of a program, i.e. input payloads. This is achieved by instrumenting the subject program, and establishing likely invariants at each basic block of the program visited during the training phase. These invariants are encoded as a model, assigning a probability value to a feature of the state variable or a set of state variables associated with a block that is about to be executed. This value reflects the probability of occurrence of a given feature value with regards to an established model of "normality".

While the current state of the art as represented by the Swaddler approach has been shown, quite convincingly, to be of practical value, it is still characterized by a number of limitations. These include issues pertaining to expressiveness, portability, overhead and accuracy. In regard to expressiveness, Swaddler cannot capture invariants across more than one control flow. Regarding portability, letting each basic block in the program be anomaly aware has the undesirable effect of making the detection system highly sensitive to code changes. Regarding overhead, performing anomaly checks at each basic block is highly expensive. It is difficult to see how the Swaddler solution can scale to enterprise applications comprising on the order of hundreds of millions of lines of code, including their library dependencies.

Finally, in regard to accuracy, a further negative byproduct of testing for anomalies at each basic block is that the system is more likely to issue false alarms. The more checks there are, the more likely it is for statistical reasoning to come to the wrong conclusion.

SUMMARY

Embodiments of the invention prescribe that anomaly detection is to be performed with regard to the data of a computer program, rather than the program control. Instead of associating likely invariants with program points, embodiments of the invention associate invariants with the data structures governing the concrete or semantic state of the program.

As used herein, an invariant is a specific rule, condition or standard, such as a particular numerical value, which is associated with given data structure of a program and indicates normal operation of the program. The invariant is broken or violated, if the specific rule or standard is deviated from, or is not adhered to, during computer runtime.

One useful embodiment of the invention is directed to a computer implemented method associated with a computer program comprising one or more basic blocks, wherein the program defines and uses multiple data structures. An example of such a data structure could be a list of all customers of a bank along with their account information, but embodiments of the invention are by no means limited thereto. The method includes identifying one or more invariants, wherein each invariant is associated with one of the concrete data structures. The method further includes determining at specified times whether an invariant has been violated. Responsive to detecting a violation of one of the invariants, the detected violation is flagged as an anomaly.

BRIEF DESCRIPTION OF THE SEVERAL VIEWS OF THE DRAWINGS

FIG. 3 is a block diagram showing a computer or data processing system that may be used in implementing an embodiment of the invention.

DETAILED DESCRIPTION

Figure 1:
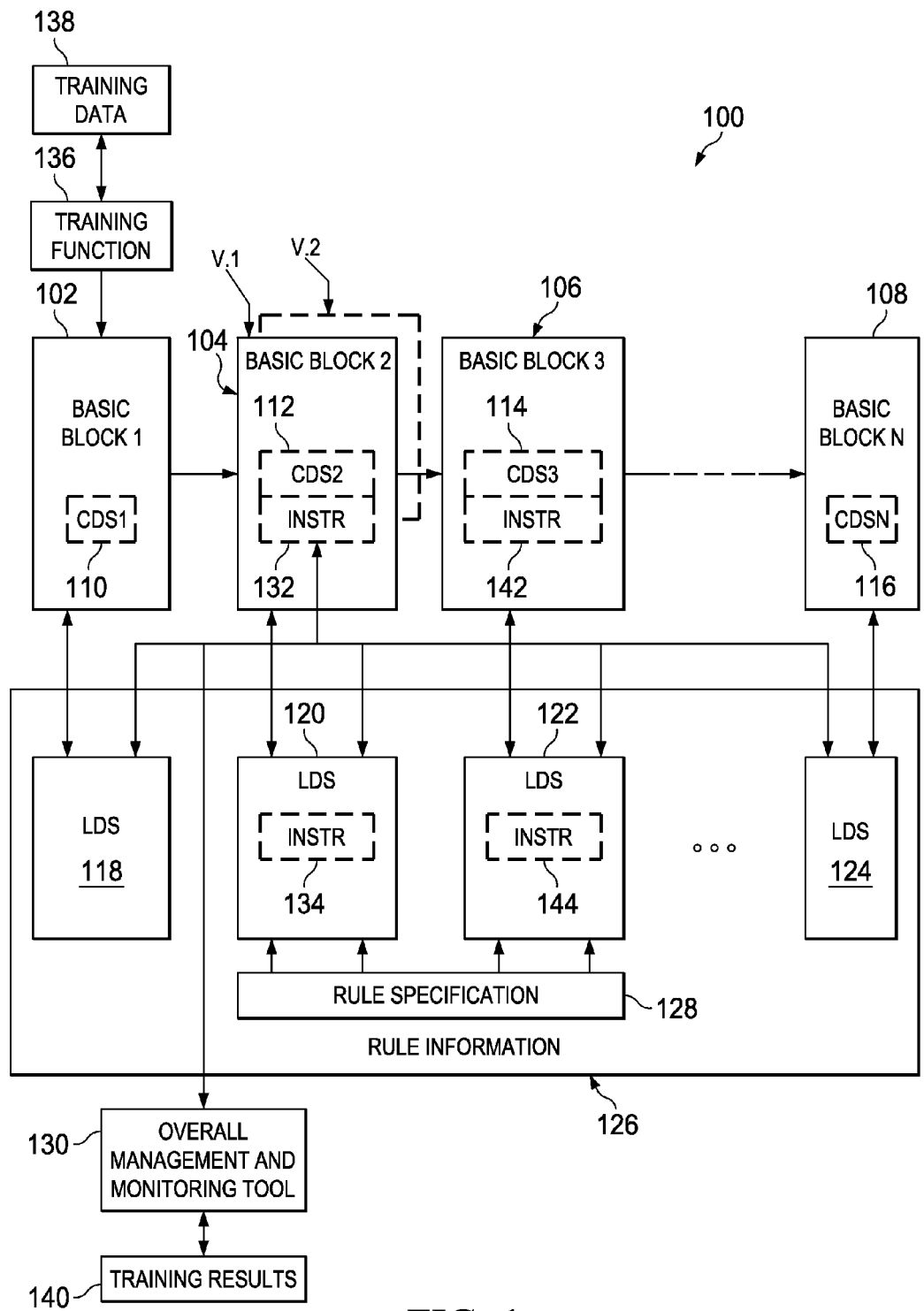
FIG. 1 is a schematic diagram depicting components of an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there are shown basic blocks 102-108, collectively representing basic blocks 1-N of a computer program 100. For purposes of illustration program 100 may comprise a program for enabling a user to perform various bank transactions or the like, but the invention is by no means limited thereto. The basic blocks 102-108 also have associated concrete data structures (CDS) 110-116, respectively.

FIG. 1 further shows logical data structures (LDS), which correspond to and can also be mapped to each of the concrete data structures 110-116, as described hereinafter in further detail. More particularly, logical data structures 118-124 correspond to concrete data structures 110-116, respectively. A tool 130 is provided to manage and monitor activities and operations of basic blocks 102-108 and logical data structures 118-124.

In order to implement embodiments of the invention, FIG. 1 is provided with a rule information component 126, which contains a rule specification 128. In accordance with the invention, it has been recognized that certain data structures associated with the runtime state of a program can indicate a condition or state considered to be normal. More specifically, certain invariants associated with the data structure can be determined, which correspond to normal conditions. Thus, invariants in the form of invariant rules are included in rule specification 128. By deriving suitable invariants for specific tasks or operations, and then monitoring the status of respective invariants at runtimes, an anomaly can be detected when one or more invariants are found to be broken or violated.

As an illustrative example for the bank transactions program 100, a useful invariant rule is a rule that the user of a particular account performs at most n operations per hour. The value of n for the particular user account is determined by an initial training phase, as described hereinafter in further detail. If the value of n is then found to be exceeded during subsequent use of the program, for the particular account, an anomaly is flagged for the account, or an alarm is triggered.

It will be appreciated that the above exemplary invariant rule requires the performance of two specific tasks, namely, identifying the particular user account, and counting the number of operations per hour for that account. Each of the invariant rules contained in rule specification 128, together with its related tasks, corresponds and is mapped to a logical data structure 118-124 or the like. Management tool 130 is operable to read rules specification 128, in order to identify the logical data structure to which respective invariant rules correspond. FIG. 1 shows the two tasks of the above invariant rule being directed from specification 128 to logical data structure 120.

Referring further to FIG. 1, logical data structure 120 is mapped to a corresponding concrete data structure 112. Concrete data structure 112 is associated with basic block 104, which performs the above operation of counting operations per unit time for the particular account. In one useful embodiment, the mapping between the logical data structure 120 and concrete data structure 112 is carried out by first applying an abstraction to the concrete data structure, in accordance with the Hawkeye technique, disclosed in the publication "Hawkeye: effective discovery of dataflow impediments to parallelization" (Proceedings of the 2011 ACM International Conference on Object Oriented Programming Systems Languages and Applications; 2011; pages 207-224; ACM New York, N.Y., USA).

As a further step in preparing the embodiment of FIG. 1 for deployment or use, it is necessary to provide instrumentation for concrete data structure 112 of basic block 104. This is done to monitor the above invariant during operation of basic block 104, in order to detect any violation of the invariant and provide notice thereof. Usefully, the instrumentation is carried out by management tool 130, which identifies certain locations at concrete data structure 112, such as locations where concrete data structure is being added to or modified. Tool 130 then inserts instrumentation code at such locations.

The instrumentation of concrete data structure 112, of basic block 104, is represented in FIG. 1 as instrumentation 132.

FIG. 1 further shows instrumentation 132 of concrete data structure 112 mapped back to logical data structure 120, as instrumentation 134. This information identifies the particular version of basic block 104, the instrumentation codes, and their respective locations in basic block 104.

After carrying out the above deployment preparation steps, the instrumented blocks must be trained in accordance with the above invariant rule. Thus, a training function 136 is provided, which receives training data 138. The training data may comprise, for example, sets of data that are typical of the data processed by the basic blocks of program 100, for a particular user. The training data could also include data recently processed by the particular user. The training data is run through the basic blocks of program 100, and instrumentation in respective blocks records results of processing the training data. For example, the results may include training data acquired by instrumentation 132, which shows that the value n for the above invariant rule does not exceed a specified value for normal operation. The collective training results 140 are delivered to management tool 130, and are also mapped back to logical data structure 120. The management tool 130 may then use the training data to set the value of n, for the invariant rule associated with basic block 104, to the specified value.

After completing the training phase, program 100 may be used or deployed in its actual environment of operations. If an invariant is then violated during runtime, for example the number of operations of the particular account per hour exceeds the specified value, notice is provided of a possible anomaly. Examples of other invariant rules for detecting anomalies include a user's balance does not change by more than x in a single operation; a user's ID does not contain characters such as "<" or ">"; and the distribution of operations by a user, e.g., checking the balance, depositing money, and withdrawing money, has a prespecified shape.

The embodiment of FIG. 1 provides a number of important benefits. For example, the instrumentation and training of concrete data structure 112 may be for Version 1 of basic block 104. Accordingly, the instrumentation and training data for such version is mapped to corresponding logical data structure 120, as described above. If basic block 104 is then updated to Version 2, the instrumentation and training data mapped to logical data structure 120 can be remapped back to concrete data structure 112, to update the new version of basic block 104. Thus, the embodiment of FIG. 1 significantly enhances the feature of portability. As a further advantage, if the program includes multiple control flows, embodiments of the invention could detect anomalies across multiple control flows. An example of multiple control flows could be a customer performing 60 transactions within one hour, or two consecutive transactions from different geographical locations.

FIG. 1 shows further that basic block 106 is provided with instrumentation 142, which pertains to a further invariant for use in detecting anomalies. Concrete data structure 114 of basic block 106 maps instrumentation 142 to corresponding logical data structure 122, as instrumentation 144. However, it is seen that instrumentation is not needed at other basic blocks of computer 100, such as blocks 102 and 108. By avoiding the need for instrumentation at all basic blocks of the program, embodiments of the invention significantly reduce overhead. Also, accuracy is improved, since it is not necessary to collect data from basic blocks that are irrelevant for anomaly detection.

Figure 2:
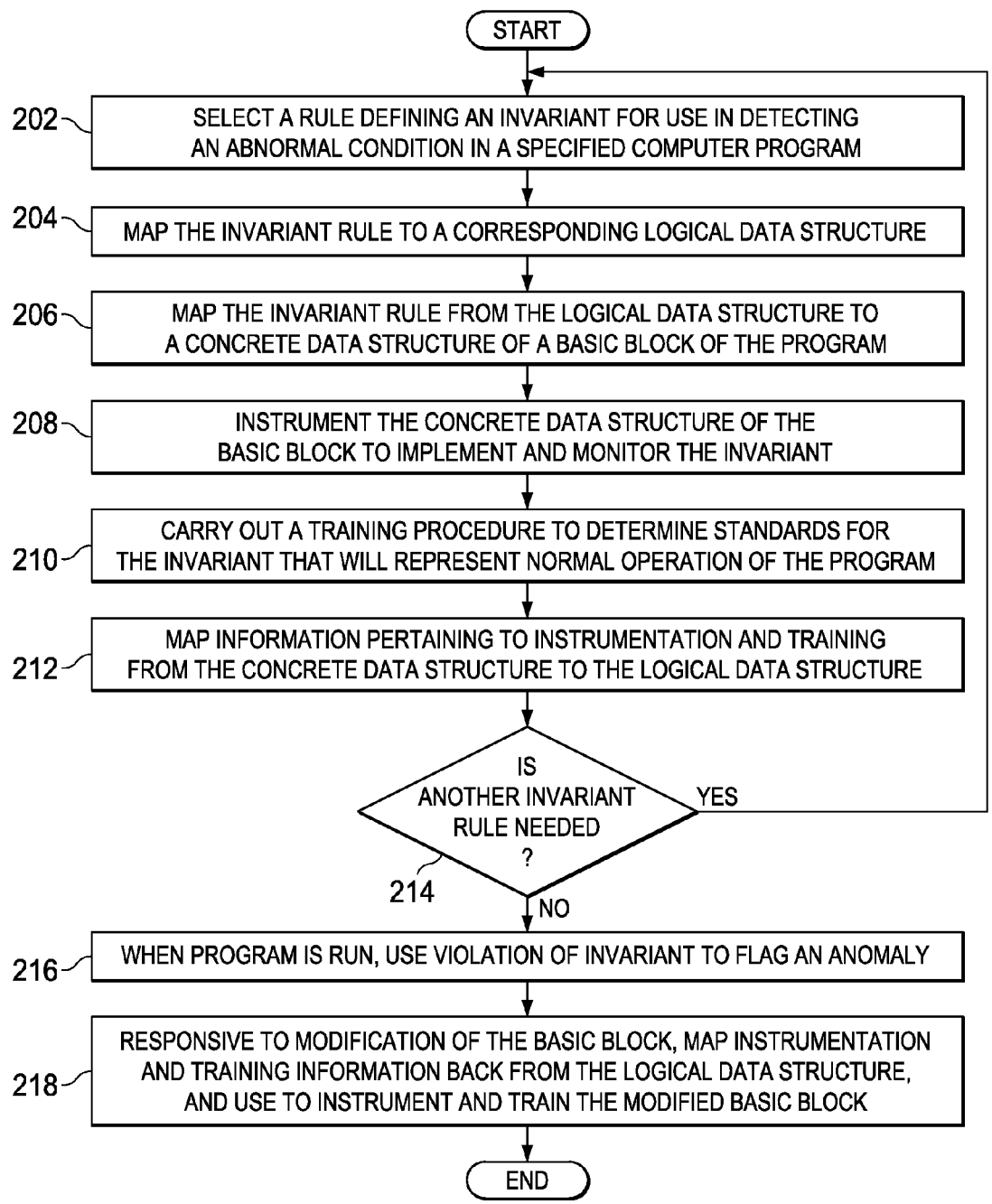
FIG. 2 is a flowchart showing steps for a method comprising an embodiment of the invention.

Referring to FIG. 2, there are shown steps for a method comprising an embodiment of the invention. At step 202 a rule defining an invariant, for use in detecting an anomaly in a specified computer program, is selected. Such invariant rule is exemplified by the rule described above, wherein a particular account performs at most n operations per hour. At step 204 the invariant rule is mapped to a corresponding logical data structure, and is mapped at step 206 from the logical data structure to a concrete data structure of a basic block of the computer.

At step 208, the basic block is instrumented as described above, to implement and monitor the invariant. At step 210 a training procedure is carried out, to determine standards for the invariant that represent normal program operation. At step 212, instrumentation and training information is mapped from the concrete data structure to the logical data structure.

Step 214 is a decision step, which determines whether another invariant rule is needed for the program. If so, steps 202-212 are repeated. Otherwise, the method proceeds to step 216. At step 216 a violation of the invariant is used to provide notice of an anomaly, when the program is running. Violation of invariants is usefully monitored continually or at specified intervals, during runtimes. Step 218 responds to modification of the basic block, to map instrumentation and training information back from the logical data structure to instrument and train the modified basic block.

Referring to FIG. 3, a block diagram of a data processing system is depicted, which may be used in implementing embodiments of the invention. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Storage devices 316 may also be referred to as computer-readable storage devices in these examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer-usable program code, or computer-readable program code that may be read and executed by a processor in processor unit 304. The program code in the different embodiments may be embodied on different physical or computer-readable storage media, such as memory 306 or persistent storage 308.

Program code 318 is located in a functional form on computer-readable media 320 that is selectively removable and may be loaded onto or transferred to data processing system 300 for execution by processor unit 304. Program code 318 and computer-readable media 320 form computer program product 322 in these examples. In one example, computer-readable media 320 may be computer-readable storage media 324. Computer-readable storage media 324 may include, for example, an optical or magnetic disk that is inserted or placed into a drive or other device that is part of persistent storage 308 for transfer onto a storage device, such as a hard drive, that is part of persistent storage 308. Computer-readable storage media 324 also may take the form of a persistent storage, such as a hard drive, a thumb drive, or a flash memory, that is connected to data processing system 300. In some instances, computer-readable storage media 324 may not be removable from data processing system 300.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 304 may take the form of a hardware unit that has circuits that are manufactured or configured for a particular use. This type of hardware may perform operations without needing program code to be loaded into a memory from a storage device to be configured to perform the operations.

For example, when processor unit 304 takes the form of a hardware unit, processor unit 304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 318 may be omitted because the processes for the different embodiments are implemented in a hardware unit.

In still another illustrative example, processor unit 304 may be implemented using a combination of processors found in computers and hardware units. Processor unit 304 may have a number of hardware units and a number of processors that are configured to run program code 318. With this depicted example, some of the processes may be implemented in the number of hardware units, while other processes may be implemented in the number of processors.

As another example, a storage device in data processing system 300 is any hardware apparatus that may store data. Memory 306, persistent storage 308, and computer-readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache, such as found in an interface and memory controller hub that may be present in communications fabric 302.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with a computer program comprising one or more basic blocks, and concrete data structures that each pertains to a basic block, a computer implemented method comprising:
   identifying one or more invariants, wherein each invariant is a specific rule associated with one of the concrete data structures and has a particular numerical value representative of a normal operation of the program and wherein a number of basic blocks that pertain to the concrete data structures associated with the one or more invariants is selectively less than a total number of basic blocks included in the computer program;
   determining at specified times whether an invariant has been violated, wherein instrumentation code, for use in detecting violation of the one or more invariants, is selectively inserted into each concrete data structure associated with the one or more invariants and wherein each concrete data structure associated with the one or more invariants is monitored for invariant violations during computer runtimes and wherein a training procedure is applied to each basic block having a concrete data structure associated with the one or more invariants, in order to determine standards that define violations of said invariants and wherein information pertaining to the instrumentation code and the training procedure is mapped from a given concrete data structure to a given logical data structure that corresponds to the given concrete data structure; and
   responsive to detecting a violation of one of the invariants, flagging the detected violation as an anomaly.

2. The method of claim 1, wherein:
   the program includes multiple control flows, and the violation of at least one invariant comprising an anomaly is detected across two or more of the multiple control flows.

3. The method of claim 1, wherein:
   each invariant comprises a selected specific invariant rule, wherein each selected specific invariant rule corresponds to a logical data structure that is mapped to the concrete data structure of a basic block and an abstraction applied to a concrete data structure associated with an invariant is used to map the concrete data structure to a corresponding logical data structure.

4. In association with a computer program comprising one or more basic blocks, and concrete data structures that each pertains to a basic block, a computer program product comprising a non-transitory computer readable storage medium having computer usable program code stored thereon, which when executed by a computer directs the computer to:
   identify one or more invariants, wherein each invariant is a specific rule associated with one of the concrete data structures and has a particular numerical value representative of a normal operation of the program and wherein a number of basic blocks that pertain to the concrete data structures associated with the one or more invariants is selectively less than a total number of basic blocks included in the computer program;
   determine at specified times whether an invariant has been violated, wherein instrumentation code, for use in detecting violation of the one or more invariants, is selectively inserted into each concrete data structure associated with the one or more invariants and wherein each concrete data structure associated with the one or more invariants is monitored for invariant violations during computer runtimes and wherein a training procedure is applied to each basic block having a concrete data structure associated with the one or more invariants, in order to determine standards that define violations of said invariants and wherein information pertaining to the instrumentation code and the training procedure is mapped from a given concrete data structure to a given logical data structure that corresponds to the given concrete data structure; and
   responsive to detecting a violation of one of the invariants, flag the detected violation as an anomaly.

5. The computer program product of claim 4, wherein:
   the computer program comprising one or more basic blocks includes multiple control flows, and the violation of at least one invariant comprising an anomaly is detected across two or more of the multiple control flows.

6. The computer program product of claim 4, wherein:
   each invariant comprises a selected specific invariant rule, wherein each selected specific invariant rule corresponds to a logical data structure that is mapped to the concrete data structure of a basic block and an abstraction applied to a concrete data structure associated with an invariant is used to map the concrete data structure to a corresponding logical data structure.

7. In association with a computer program comprising one or more basic blocks, and concrete data structures that each pertains to a basic block, a computer system comprising:
   a bus;
   a memory connected to the bus, wherein computer readable program code is stored on the memory; and
   a processor unit connected to the bus, wherein the processor unit executes the computer readable program code to:
      identify one or more invariants, wherein each invariant is a specific rule associated with one of the concrete data structures and has a particular numerical value representative of a normal operation of the program and wherein a number of basic blocks that pertain to the concrete data structures associated with the one or more invariants is selectively less than a total number of basic blocks included in the computer program;
      determine at specified times whether an invariant has been violated, wherein instrumentation code, for use in detecting violation of the one or more invariants, is selectively inserted into each concrete data structure associated with the one or more invariants and wherein each concrete data structure associated with the one or more invariants is monitored for invariant violations during computer runtimes and wherein a training procedure is applied to each basic block having a concrete data structure associated with the one or more invariants, in order to determine standards that define violations of said invariants and wherein information pertaining to the instrumentation code and the training procedure is mapped from a given concrete data structure to a given logical data structure that corresponds to the given concrete data structure; and
      responsive to detecting a violation of one of the invariants, flag the detected violation as an anomaly.

\* \* \* \* \*